United States Patent [19]

Okutsu

[11] Patent Number: 4,829,396
[45] Date of Patent: May 9, 1989

[54] MAGNETIC DISC APPARATUS FOR DEFLECTING MAGNETIC HEADS FROM CONTACT WITH THE RECORDING DISC SURFACE

[75] Inventor: Naohiro Okutsu, Kamakura, Japan
[73] Assignee: Mitsubishi Denki Kabushiki Kaisha, Japan
[21] Appl. No.: 37,148
[22] Filed: Apr. 10, 1987
[30] Foreign Application Priority Data Apr. 15, 1986 [JP] Japan .................................. 61-86349

[51] Int. Cl.⁴ ........................ G11B 5/54; G11B 21/22
[52] U.S. Cl. ................................ 360/105; 360/97.01
[58] Field of Search ............... 360/105, 106, 104, 97, 360/99

[56] References Cited

U.S. PATENT DOCUMENTS

| | | | |
|---|---|---|---|
| 4,017,898 | 4/1977 | Toombs et al. | 360/105 |
| 4,019,205 | 4/1977 | Salmond et al. | 360/105 |
| 4,307,425 | 12/1981 | Kaneko et al. | 360/98 |
| 4,703,376 | 10/1987 | Edwards et al. | 360/105 |

FOREIGN PATENT DOCUMENTS 0038773 2/1985 Japan .................................. 360/105

*Primary Examiner*—Stuart N. Hecker
*Assistant Examiner*—David J. Severin
*Attorney, Agent, or Firm*—Leydig, Voit & Mayer

[57] ABSTRACT

A magnetic disc apparatus includes a magnetic disc drive assembly on a base for driving a magnetic disc, a magnetic head supporting assembly disposed on the base for supporting and moving a magnetic head with respect to the magnetic disc for magnetic recording and reproducing and a control circuit for controlling the head supporting assembly. The head supporting assembly includes a rotary actuator, an actuator arm connected to the rotary actuator to swing the head along the surface of the disc in the radial direction thereof, a resilient suspension arm extending from one end of the actuator arm in the longitudinal direction thereof, for resiliently supporting at the extending end thereof a magnetic head. The magnetic head supporting assembly further comprises a deflecting unit which is engageable with the suspension arm for deflecting the suspension arm to move the magnetic head in a direction perpendicular to and away from the recording surface of the disc when the disc is stopped, thereby preventing the heads from contacting the surfaces of the discs when the discs start rotating. This arrangement can be applied to any type of magnetic disc apparatus regardless of whether or not it uses a CSS System.

6 Claims, 4 Drawing Sheets

MAGNETIC DISC APPARATUS FOR DEFLECTING MAGNETIC HEADS FROM CONTACT WITH THE RECORDING DISC SURFACE

BACKGROUND OF THE INVENTION

The present invention relates to a magnetic disc apparatus, and more particularly to a magnetic head supporting assembly for use in a magnetic disc apparatus.

FIG. 1 illustrates one example of a conventional magnetic disc apparatus and FIG. 2 illustrates, partly in an enlarged sectional view, a principal portion of a magnetic head supporting assembly for use in the magnetic disc apparatus. Such a conventional magnetic disc apparatus is disclosed in U.S. Pat. No. 4,307,425.

The conventional magnetic disc apparatus comprises a magnetic disc drive assembly 20 mounted on a base (not shown) and a magnetic head supporting assembly 30 disposed on the base in a predetermined positional relationship with respect to the magnetic disc drive assembly 20. The magnetic disc drive assembly 20 comprises a rotary shaft 21 for supporting a pair of vertically spaced magnetic discs 4a and 4b as shown in FIG. 2 and a motor 22 for rotatably driving the rotary shaft 21. The magnetic head supporting assembly 30 comprises a rotary actuator 31 including a rotary shaft 5 which is pivotably mounted thereto and an actuator arm 3 which is secured to the rotary shaft 5. The actuator arm 3 has a pair of mounting members 32, each extending from one end of the actuator arm 3. The head supporting assembly 30 further comprises two pairs of suspension arms 2, each pair inwardly extending from one side of the mounting member 32 of the actuator arm 3. Each suspension arm 2 resiliently supports at the extending end thereof a magnetic head 1 by which magnetic recording and reproducing are achieved on the disc 4. The actuator arm 3 is swingably driven about the rotary shaft 5 by the rotary actuator 31 to move the suspension arms 2 in parallel with the surfaces of the discs 4a and 4b thereby positioning each of the magnetic heads 1 over a desired position of the magnetic discs 4a and 4b.

In the thus-constructed conventional apparatus, the suspension arm 2 is made of an elastic material and is disposed at a predetermined angle with respect to the surface of the disc 4, thereby pressing the head 1 against the surface of the disc 4 by means of its elasticity. When the disc 4 is rotated, an air flow is generated over the surface of the disc 4. When the disc 4 rotates at a high speed, the floating force of the head 1 produced by the air flow is greater than the pressing force of the suspension arm 2, whereby the head 1 is lifted up from the surface of the disc 4 and a small air gap results between the head 1 and the surface of the disc 4. During this time, the magnetic head 1 can move over the surface of the disc 4 in accordance with the movement of the actuator arm 3.

The disc 4 is coated with a resinous material for protecting a magnetic layer thereon. When the disc is stopped, the magnetic head 1 is pressed against the resinous surface of the disc 4 due to the elasticity of the suspension arm 2. Accordingly, it is possible for the head 1 and the surface of the disc 1 to stick to each other.

The thus-constructed conventional magnetic disc apparatus uses a contact-start-stop system. Namely, first, when the disc is stopped, the head 1 is in contact under pressure with the surface of the disc 4 due to the elasticity of the suspension arm 2. Then, when the disc 4 starts rotating, the head 1 is lifted up by the floating force generated by the air flow produced over the surface of the disc 4 as the rotation speed of the disc increases and when the disc 4 is stopped, the head 1 contacts again the surface of the disc 4 as the rotation speed of the disc decreases. This is referred to as a CSS system hereafter.

When the apparatus is not in operation, the head 1 is in contact with the surface of the disc under pressure and stuck to the disc surface, as stated above. When the disc starts to rotate, the head 1 may scratch the surface of the disc 4, since the head 1 contacts the disc 4 at low rotational speeds, whereby the head 1 and the disc 4 may be damaged. Accordingly, the lifetime of the apparatus using the CSS system is limited and the head 1 and the disc 4 are restricted to expensive materials, which results in an expensive magnetic disc apparatus.

SUMMARY OF THE INVENTION

Accordingly, an object of this invention is to provide a magnetic disc apparatus free from the above discussed problems.

Another object of this invention is to provide a magnetic disc apparatus in which the disc and the head are not damaged due to the contact therebetween.

Still another object of this invention is to provide a magnetic disc apparatus which is less expensive than the conventional magnetic disc apparatus.

The magnetic disc apparatus according to this invention includes a magnetic disc drive assembly disposed on a base for driving a magnetic disc and a magnetic head supporting assembly disposed on the base for supporting and moving a magnetic head with respect to the magnetic disc for magnetic recording and reproducing. The magnetic head supporting assembly comprises a rotary actuator, an actuator arm connected to the rotary actuator to swing in parallel with the surface of the disc in the radial direction thereof, a suspension arm, extending from one end of the actuator arm in the longitudinal direction thereof, for resiliently supporting at one end thereof a magnetic head. The magnetic head supporting assembly further comprises deflecting means, which is engageable with the suspension arm, for resiliently deflecting the suspension arm to move the magnetic head in a direction perpendicular to and away from the recording surface of the disc.

BRIEF DESCRIPTION OF THE DRAWINGS

This invention will become more readily apparent from the following detailed description of the preferred embodiments of this invention taken in conjunction with the accompanying drawings, in which.

DETAILED DESCRIPTION OF THE PREFERRED EMBODIMENTS

Figure 1:
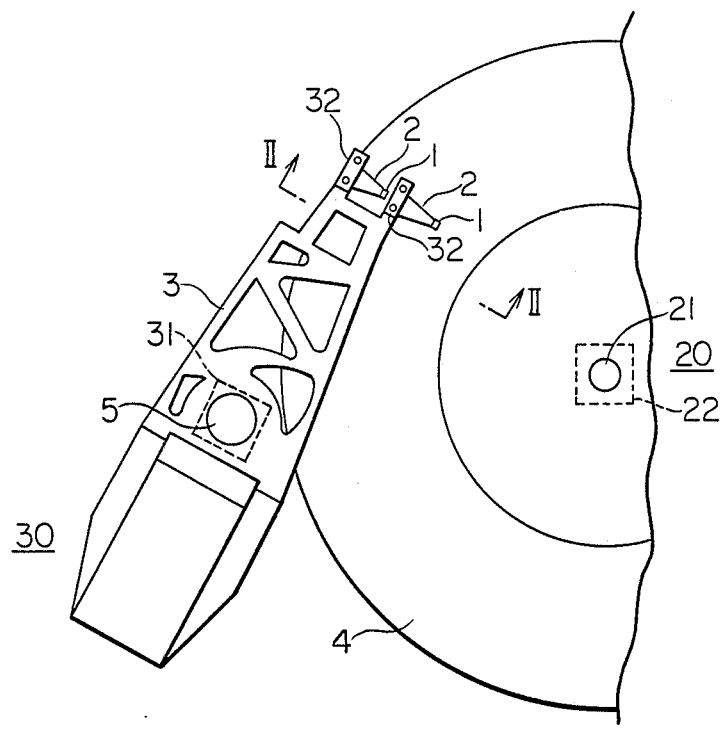
FIG. 1 is a plan view of a conventional magnetic disc apparatus.
Figure 2:
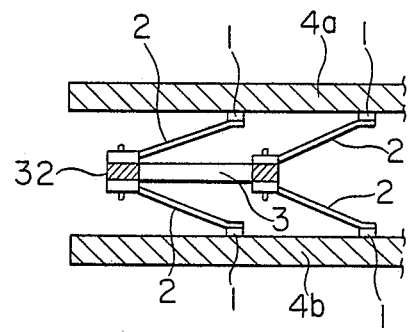
FIG. 2 is a cross sectional view of a principal portion of the magnetic disc apparatus taken along line II—II of FIG. 1.

The magnetic disc apparatus is substantially similar to the conventional magnetic disc apparatus illustrated in FIGS. 1 and 2 in that both apparatuses include a magnetic disc drive assembly disposed on a base (not shown) and a magnetic head supporting assembly disposed on the base for supporting and moving a magnetic head with respect to the magnetic disc for magnetic recording and reproducing. However, the magnetic disc apparatus of this invention is different from the conventional apparatus in that the former includes a head supporting assembly 40 comprising a deflecting unit 46 and a control circuit 50 for controlling the contacting states of the magnetic heads with the discs.

In FIGS. 3 to 6 in which one embodiment of this invention is illustrated, the magnetic disc apparatus includes a disc drive assembly 20 disposed on a base (not shown) for driving at least two magnetic discs 4a and 4b which are co-axially positioned one above the other and a head supporting assembly 40 disposed on the base for supporting and moving magnetic heads 41 with respect to the magnetic discs 4a and 4b on which magnetic recording and reproducing are achieved. A control circuit 50 for controlling the head supporting assembly 40 is also provided.

Figure 4:
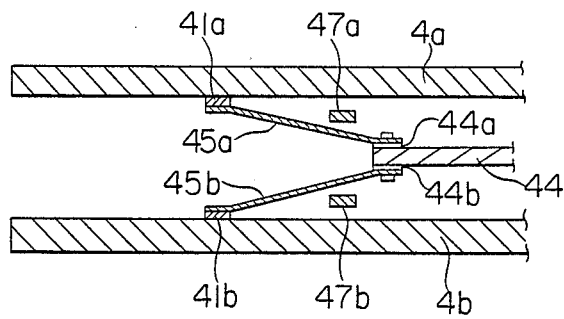
FIG. 4 is a cross sectional view of a principal portion of the magnetic disc apparatus taken along line IV—IV of FIG. 3.

The head supporting assembly 40 comprises a rotary actuator 42 having a rotary shaft 43, an actuator arm 44 connected to the rotary actuator 42 through the rotary shaft 43 for swinging between and in parallel with two opposing surfaces of the discs 4a and 4b in the radial direction thereof, two pairs of suspension arms 45 extending from one end of the actuator arm 44 in the longitudinal direction thereof. One of each pair of suspension arms 45a is mounted on the upper side 44a of the actuator arm 44 so as to extend at a predetermined angle with respect to the surface of the upper disc 4a, such that the head 41a supported by the suspension arm 45a comes into contact with the surface of the disc 4a as shown in FIG. 4. The other suspension arm 45b is mounted on the lower side 44b of the actuator arm 44 so as to extend at a predetermined angle with respect to the surface of the lower disc 4b, such that the head 41b supported by the suspension arm 45b comes into contact with the surface of the disc 4b as shown in FIG. 4. The head supporting assembly 40 further comprises a deflecting unit 46 for deflecting the suspension arms 45a and 45b respectively. This deflecting unit 46 includes two levers 47a and 47b which are movable in parallel with the respective surfaces of the discs 4a and 4b. The levers 47a and 47b extend from one side of the deflecting unit 46 in a direction substantially perpendicular to the extending direction of the suspension arms 45a and 45b and are movable in a direction parallel with the extending direction of the actuator arm 44. Accordingly, the levers 47a and 47b engage the upper and lower suspension arms 45a and 45b as the levers 47a and 47b are moved. Thus, these levers can deflect the respective suspension arms 45a and 45b so as to move the magnetic heads 41a and 41b in a direction perpendicular to and away from the surfaces of the vertically spaced discs 4a and 4b respectively as shown in FIG. 5.

Figure 3:
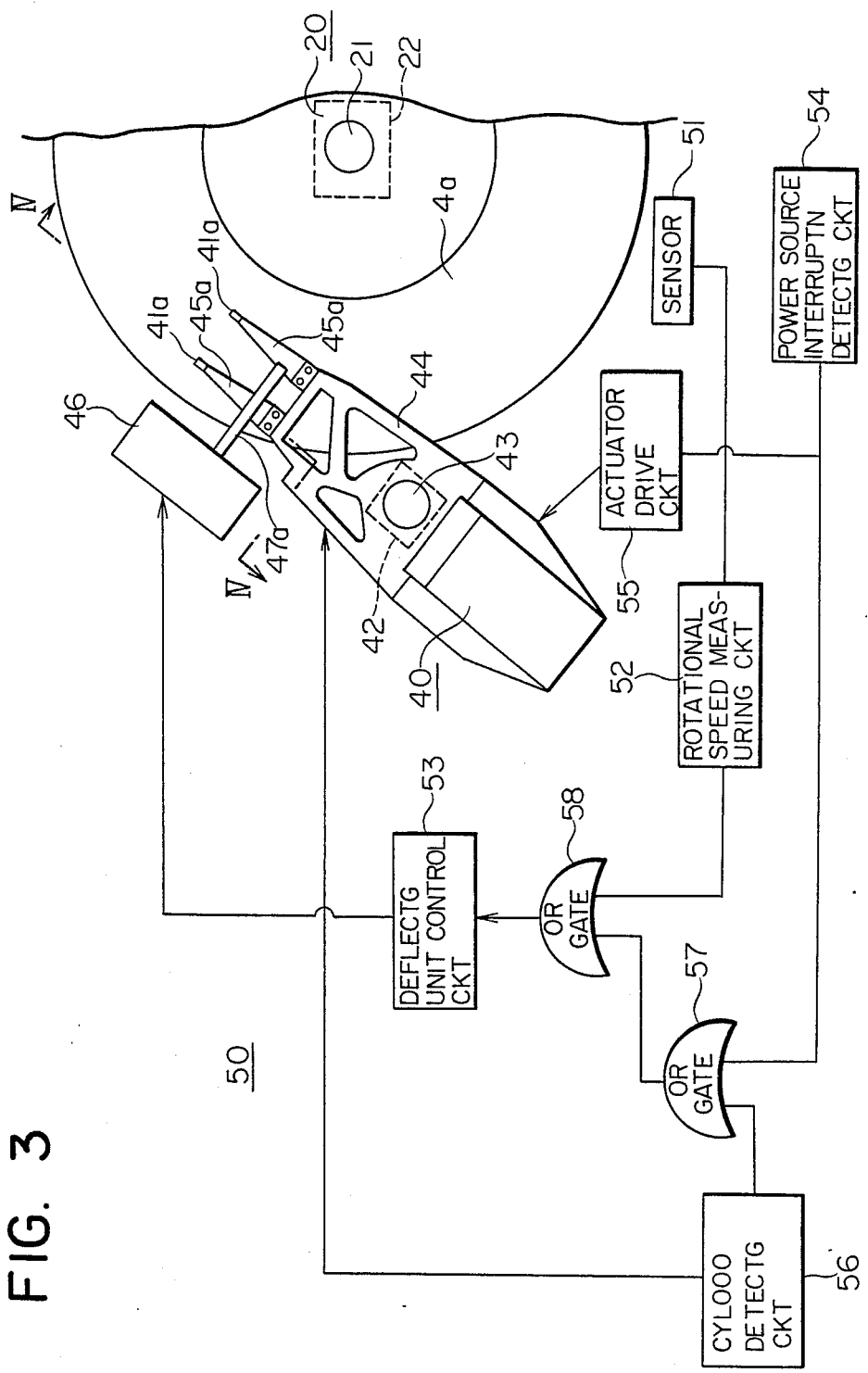
FIG. 3 is a plan view of a magnetic disc apparatus according to an embodiment of this invention.

As shown in FIG. 3, the magnetic disc apparatus further includes the control circuit 50 for controlling the head supporting assembly 40. The control circuit 50 comprises a sensor 51, a rotational speed measuring circuit 52 connected to the sensor 51, a power source interruption detecting circuit 54, an actuator drive circuit 55 connected to the circuit 54, a CYL000 detecting circuit 56 connected to the circuit 54 and a deflecting unit control circuit 53 connected to the circuits 52, 54 and 56 through OR gates 57 and 58. The sensor 51 monitors the rotation of the discs 4a and 4b and provides a signal to the rotational speed measuring circuit 52. The circuit 52 calculates the rotational speed of the discs 4a and 4b in accordance with the signal from the sensor 51 and provides a signal representative of the calculated rotational speed to the deflecting unit control circuit 53. The circuit 53 controls the deflecting unit 46 to move the levers 47a and 47b in accordance with the signal from the circuit 52. The power source interruption deflecting circuit 54 detects whether the power source for the disc drive unit 20 is switched off or not and provides a signal to the actuator arm drive circuit 55 and the defelecting unit control circuit 53. The actuator drive circuit 55 drives the rotary actuator 42 in accordance with the signal provided from the circuit 54. The circuit 53 controls the deflecting unit 46 to drive the levers 47a and 47b between an activated position and an inactivated position in accordance with the provided signal. In the activated positions, the levers 47a and 47b engage and deflect the suspension arms 45a and 45b against their resiliency to lift the magnetic head from the disc surface, and in the inactivated position, the levers 47a and 47b disengage the suspension arms 45a and 45b allowing the suspension arms 45a and 45b to bring the head into contact with the disc surface. The CYL000 detecting circuit 56 detects if the heads 41a and 41b are positioned at zero cylinders of the discs 4a and 4b and provides a signal representative of the detected result to the circuit 53. The circuit 53 controls the deflecting unit 46 to move the levers to deflect the suspension arms 45a and 45b, when the heads 41 are positioned at the zero cylinders of the discs 4a and 4b.

Figure 5:
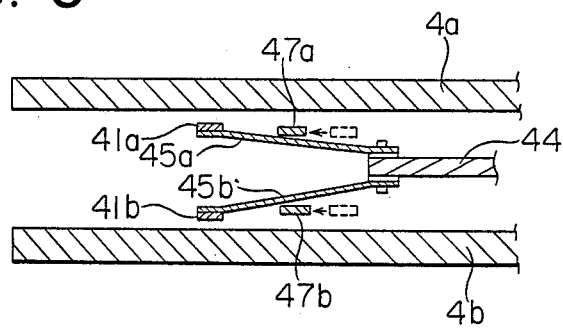
FIG. 5 is a cross sectional view of the principal portion showing the movement of the head.

In the above described embodiment, when the discs 4a and 4b are stationary, the suspension arms 45a and 45b are deflected by the levers 47a and 47b of the deflecting assembly 46 so that the heads 41a and 41b supported by the suspension arms 45a and 45b are away from the respective surfaces of the discs 4a and 4b, as shown in FIG. 5.

In case of the magnetic disc apparatus which does not use the CSS system, the magnetic heads 41a and 41b are away from the surfaces of the upper and lower discs 4a and 4b when the magnetic disc apparatus is turned on.

When the rotational speed calculating circuit 52 determines the rotational speed of the discs and the rotational speed reaches a predetermined high speed sufficient to cause the heads to float, the deflecting unit control circuit 53 instructs the deflecting unit 46 to move the levers 47a and 47b into the inactivated position to release the suspension arms 45a and 45b, whereby the magnetic heads 41a and 41b can be held in a floating position with respect to the surfaces of the rotating discs 4a and 4b.

Figure 6:
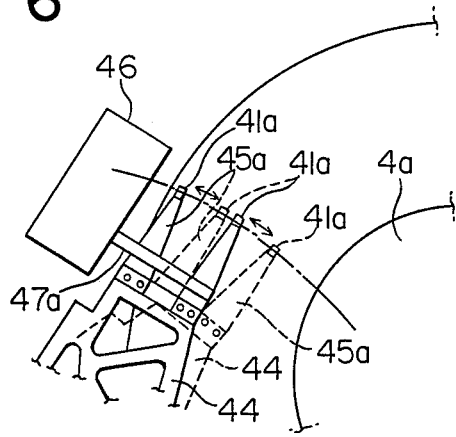
FIG. 6 is a plan view of the principal portion of the magnetic disc apparatrus.

When the disc 4 is to be stopped, the power source interruption detecting circuit 54 detects the interruption of the power source to the disc drive assembly 20, the actuator arm conrol circuit 55 controls the actuator arm 44 to move the heads 41a and 41b toward the outer periphery of the discs 4a and 4b, as shown in FIG. 6. When the CYL000 circuit 56 detects that the heads 41 are positioned on the zero cylinders of the discs 4a and 4b, the deflecting unit control circuit 53 instructs the deflecting unit 46 to move the levers to deflect the suspension arms 45, thereby moving the heads 41a and 41b away from the discs 4a and 4b.

In a case where it is necessary only to separate the stuck heads from the surfaces of the discs 4a and 4b, the levers 47a and 47b are first moved toward the actuator arm 44 only several milimeters to engage and deflect the suspension arms 45a and 45b for moving the heads 41a and 41b away from the surfaces of the discs 4a and 4b. Then the heads 41a and 41b are placed again on the discs 4a and 4b and the discs can now be driven. Now, the CSS system can be applied to the magnetic disc apparatus without the problems of the conventional magnetic disc apparatus.

Thus, this invention can be applied to the magnetic disc apparatus regardless of whether or not the magnetic disc apparatus uses the CSS system. In both cases, the heads can be separated from the disc surface immediately before the rotation of the disc even when they are stuck to the surfaces of the discs. Furthermore, since the suspension arms 45a and 45b extend in the longitudinal direction of the actuator arm 44 as shown in FIG. 3, two suspension arms 45a can be deflected by only one lever at one time. Besides, since the levers 47a and 47b extend in the direction substantially perpendicular to the extending direction of the suspension arms 45a and 45b, the suspension arms 45a and 45b do not touch the levers 47a and 47b, when the actuator arm 44 pivotably swings about the rotary shaft 43 during operation.

Figure 7:
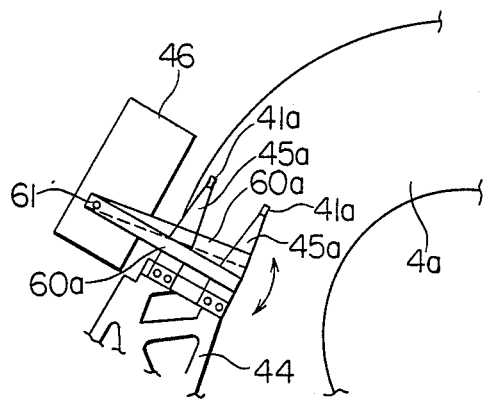
FIG. 7 is a plan view of a principal portion of the magnetic disc apparatus according to another embodiment of this invention.
Figure 8:
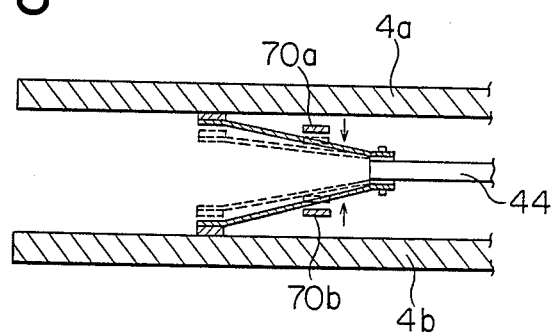
FIG. 8 is a cross sectional view of the principal portion showing the movement of the head.
Figure 9:
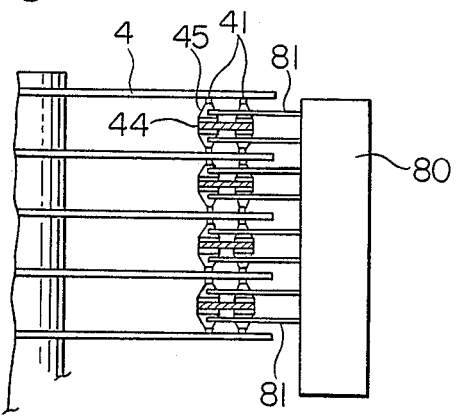
FIG. 9 is a cross sectional view of a principal portion of the head supporting assembly according to still another embodiment of this invention.

Although the levers 47a and 47b move in parallel with the longitudinal direction of the suspension arms 45a and 45b in the embodiment illustrated in FIGS. 3 to 6, levers 60 may be pivotably moved about a pivot 61 as shown in FIG. 7 or levers 70a and 70b may be moved in a direction perpendicular to the surfaces of the discs 4a and 4b as shown in FIG. 8. Further, in case that the disc drive assembly 20 includes more than two discs and the head supporting assembly 30 includes a plurality of actuator arms 44 proportionally corresponding to the number of the discs, the deflecting unit 80 may be provided with a corresponding number of levers 81 as shown in FIG. 9, thereby providing the same effect as the embodiment illustrated in FIGS. 3 to 6.

As can be seen from the above description, the deflecting unit includes the levers which can move independently from the movement of the actuator arm. These levers are adapted to move the heads away from the surfaces of the discs, just before the magnetic disc apparatus is brought into operation, thereby preventing the disc from rotating while the heads are stuck to the surfaces of the discs. Further, the magnetic disc apparatus can be operated by the other system than the CSS system by controlling the operation time of the deflecting unit. Thus, the heads and the discs are not restricted by given material, thereby providing a low cost magnetic disc apparatus with high reliability.

What is claimed is:

1. A magnetic disc apparatus including a disc drive assembly disposed on a base and driving a magnetic disc, and a head supporting assembly disposed on the base and moving magnetic heads with respect to a recording surface of said magnetic disc for magnetic recording and reproducing, said head supporting assembly comprising:

a rotary actuator;

an actuator arm connected to said rotary actuator to swing radially relative to said magnetic disc in parallel with the recording surface thereof;

a pair of resilient suspension arms extending substantially parallel from one end of said actuator arm in a longitudinal direction thereof and being spaced radially relative to said magnetic disc, said suspension arms resiliently supporting respective magnetic heads at one end thereof; and a deflecting member extending substantially perpendicular to said actuator arm and movable into engagement with both said resilient suspension arms to deflect both said resilient suspension arms and move said magnetic heads in a direction perpendicular to and away from the recording surface of said magnetic disc.

2. A magnetic disc apparatus as claimed in claim 1 wherein a plurality of deflecting members comprising levers are provided with each lever associated with each pair of said suspension arms.

3. A magnetic disc apparatus as claimed in claim 1 further comprising a control means including a circuit for operating said deflecting member in accordance with an operating state of said magnetic disc.

4. A magnetic disc apparatus as claimed in claim 1 wherein said resilient suspension arms are supported by said actuator arm at a predetermined angle of inclination with respect to the recording surface of said magnetic disc, and said deflecting member comprises a lever movable parallel with the recording surface and engageable with both said suspension arms.

5. A magnetic disc apparatus as claimed in claim 4 wherein said lever swings about a pivot.

6. A magnetic disc apparatus as claimed in claim 4 wherein said resilient arms are supported by said actuator arms at a predetermined angle of inclination with respect to the recording surface of said magnetic disc and said deflecting member comprises a lever movable perpendicular to the recording surface of said magnetic disc.

* * * * *